J. F. PRIBNOW.
SAW SWAGE.
APPLICATION FILED APR. 16, 1908.
1,016,091.
Patented Jan. 30, 1912.
3 SHEETS—SHEET 1.
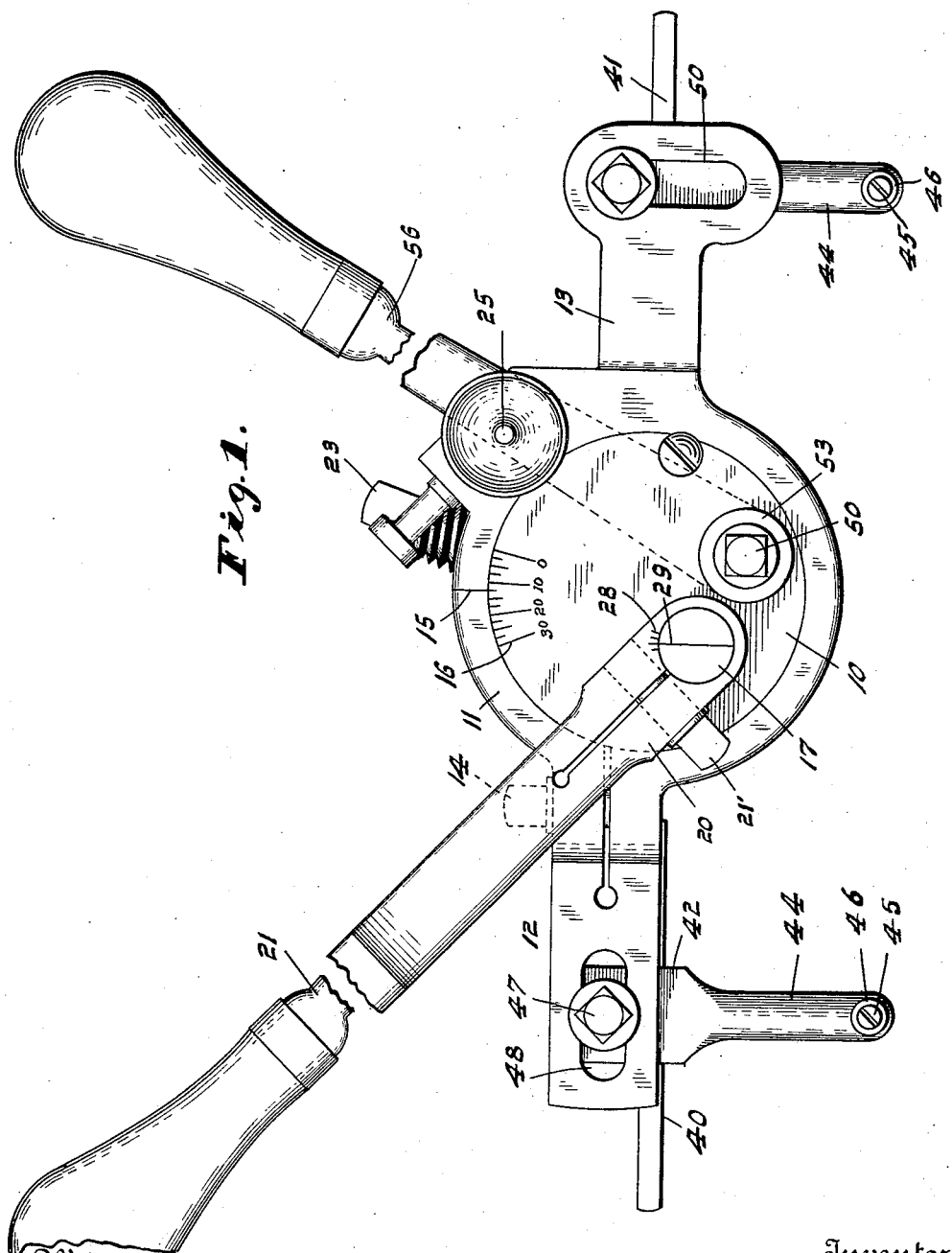
Witnesses
Frank A. Fahle
Thomas W. McMeans
Inventor
John F. Pribnow,
By Bradford Hood
Attorneys

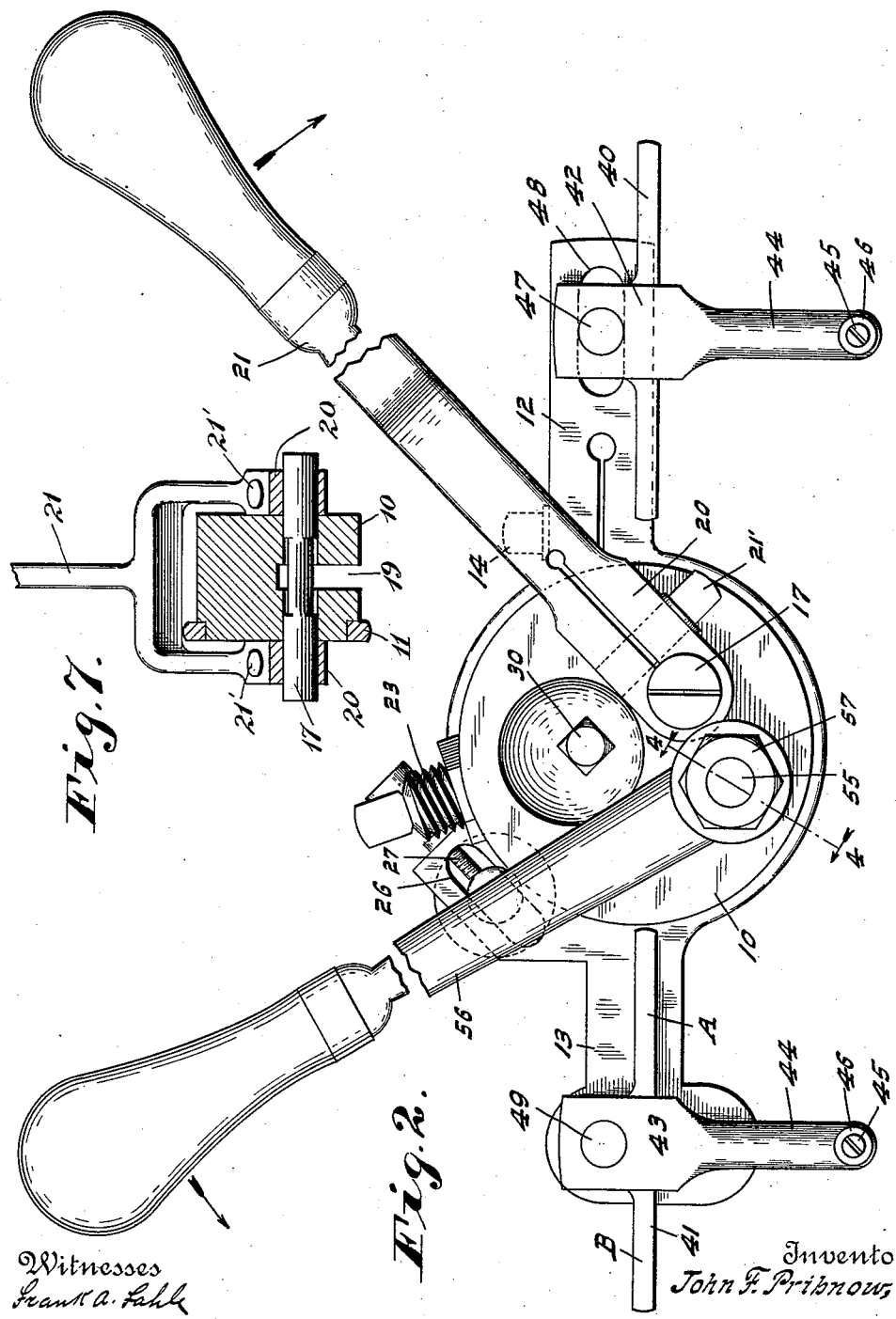

J. F. PRIBNOW.
SAW SWAGE.
APPLICATION FILED APR. 16, 1908.
1,016,091.
Patented Jan. 30, 1912.
3 SHEETS—SHEET 3.
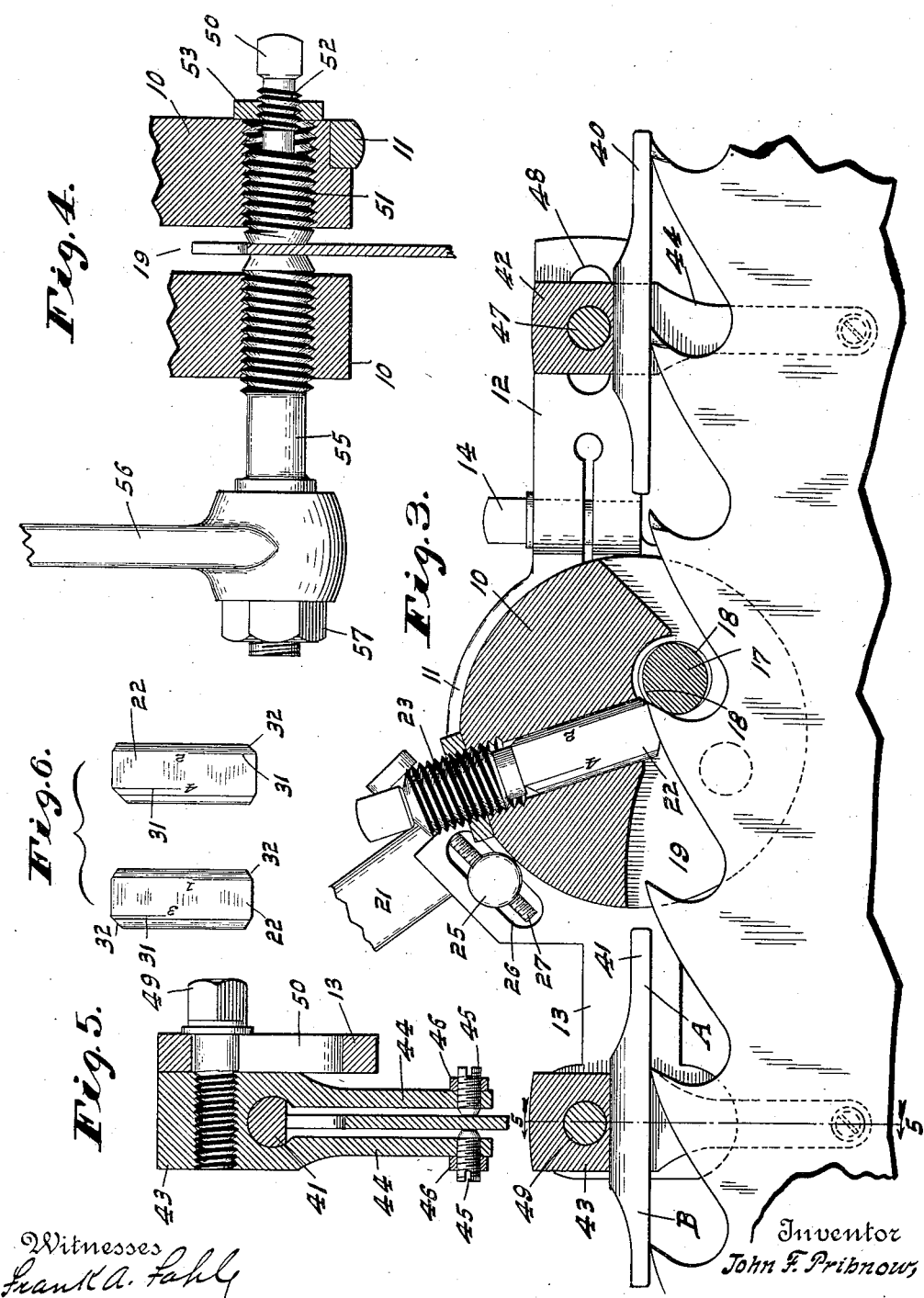
Witnesses
Frank A. Fahl
Thomas W. McMeans
Inventor
John F. Pribnow
By Bradford Hood
Attorneys

UNITED STATES PATENT OFFICE.

JOHN F. PRIBNOW, OF MELLEN, WISCONSIN.

SAW-SWAGE.

1,016,091.  Specification of Letters Patent.  Patented Jan. 30, 1912.

Application filed April 16, 1908. Serial No. 427,465.

*To all whom it may concern:*

Be it known that I, JOHN F. PRIBNOW, a citizen of the United States, residing at Mellen, in the county of Ashland and State of Wisconsin, have invented certain new and useful Improvements in Saw-Swages, of which the following is a specification.

The object of my invention is to produce a tool by means of which the teeth of saws of various sizes may be accurately swaged, the several parts being so readily adjustable as to adapt the tool to saws of different tooth characters and pitch, and to straight or curved saws.

The accompanying drawings illustrate my invention.

Figure 1 is an elevation of the gage side of a tool embodying my invention; Fig. 2 an elevation of the opposite side; Fig. 3 a section in the saw plane; Fig. 4 a section on line 4—4 of Fig. 2; Fig. 5 a section on line 5—5 of Fig. 3; Fig. 6 an elevation of two anvils, and Fig. 7 a section on the axis of the swage and on a small scale.

In the drawings, 10 indicates a main body preferably cylindrical and provided at one end with a reduced portion upon which is rotatably mounted a ring 11 provided with a pair of oppositely extending arms 12 and 13. Ring 11 may be clamped in any desired angular position relative the main body 10 by means of a suitable clamping screw 14 and in order to accurately indicate the relation between the main body 10 and ring 11 I provide ring 11 with a gage mark 15 adapted to register with any one of a series of gage marks 16 carried on the main body 10. Journaled in the main body 10 and extending longitudinally through the same, parallel with but eccentric to the axis of the body, is a rotatable swage 17 provided with the usual eccentric swage surfaces 18, 18 which extend across the saw-receiving slot 19 formed transversely through the lower part of the body 10. The ends of the swage 17 project from the opposite faces of body 10 and lie within the arms 20 of the swage lever 21, said arms 20 straddling the main body 10 and being slit and each provided with a clamping screw 21' by means of which the swage may be readily clamped within the lever 21 so as to move therewith. Arranged to coöperate with swage 17 is an anvil 22 which fits within an opening formed transversely through the body 10, an adjustable abutment 23 being provided, in the usual manner, by means of which the anvil 22 may be held at any desired distance from the swage. The throat between the swage and the anvil, in receiving position, determines the extent to which a saw tooth may be inserted between the swage and anvil. In order to obtain accurate results I therefore provide an abutment 25 against which the lever 21 lies when the swage is in receiving position. This abutment 25 comprises a pair of members threaded together and passed through a slot 26 formed in ring 11 and an adjusting screw 27 is passed transversely through one of these members, the arrangement being such that, by turning screw 27 the abutment 25 may be brought accurately to the desired position, whereupon the said member 25 may be clamped tightly in place.

In addition to the adjustment just referred to for determining the starting position of lever 21, the condition of the throat between the anvil and swage at the time of reception of the tooth may be further altered and adjusted by a rotation of the swage relative to the lever 21, and in order that this may be accurately accomplished I provide, on the outer face of one arm of lever 21, a series of gage marks 28 with which a mark 29 on the swage may be caused to register, the marks 28 being numbered, 1, 2, etc., in order to properly identify them. This adjustment of the swage relative to its operating lever is for the purpose of receiving teeth of different shapes and such teeth require an anvil properly positioned. I therefore provide several anvils 22 each being preferably provided at each of its ends with a working anvil surface, the working corner being more or less offset from the axis of the anvil and therefore each occupying a different relation to the swage. In order to accurately grind these working surfaces I form each anvil with a substantially cylindrical body having one side flattened in order that it may be engaged by a holding screw 30 and on this flattened surface I provide marks or lines 31 each of which indicates the amount to which the corner of the anvil is to be dubbed off at 32 to form an anvil of the desired extent, said lines 31 being numbered to correspond with the numbering of the indicator marks 28.

To obtain proper swaging the anvil must rest squarely in the back of the saw tooth and, therefore, in order to adjust the apparatus to teeth having their backs at different angles I provide a pair of guide plates 40 and 41, these plates having under surfaces adapted to rest upon the tips of teeth of the saw. Plates 40 and 41 are carried in heads 42 and 43, respectively, which heads are identical and are each provided with a pair of fingers 44 adapted to straddle the saw blade. Each finger 44 is provided in its lower end with an adjusting screw 45 and check nut 46, the arrangement being such that the distance between the adjacent inner ends of each pair of screws may be accurately adjusted so as to accurately position the tool upon a saw blade. Head 42 is attached to arm 12 by a bolt 47 which clamps it to arm 12. The bolt 47 passes through a slot 48 in arm 12 said slot being parallel with the working face of plate 40 in order that said plate may be adjusted longitudinally toward and from the body 10 in order to bring the plate in proper position to rest upon one or more teeth of the saw, this adjustment being necessary in order to fit the tool for use with saws of different pitch.

Head 43 is similarly provided with a clamping bolt 49 like bolt 47 but this bolt passes through a slot 50 formed in arm 13 substantially at right angles to the slot 48 so that plate 41 may be adjusted in a line substantially at right angles to its working face and thus fit the tool for use in connection with either straight or curved saws. Because plate 41 is mounted so as to be adjustable in a line substantially at right angles to its vertical face it would be somewhat difficult to adjust said plate longitudinally also and I have therefore adopted the more convenient construction of making the end A of said plate longer than the end B so that, by reversing head 43, the position of plate 41 may be varied longitudinally relative to the main body 10. The position of plates 40 and 41 relative to the throat between the swage and anvil may be accurately determined by means of the scale 16 and indicator mark 15.

In order to clamp the instrument upon the saw during the swaging action, body 10 is provided with a stationary abutment 50. This abutment is threaded into the main body 10, parallel with the swage, with comparatively coarse threads 51, and is also provided with finer threads 52 upon which is mounted a check nut 53 adapted to engage the outer end of the main body 10. The direction of the two threads 51 and 52 is the same and in adjusting the abutment it is brought nearly to position by the coarse threads. The check nut is then moved up against body 10 on the finer threads and a slight further turn of the abutment then given with a wrench. This serves to move the abutment both through the main body and the check nut but the movement through the main body is more rapid than the movement through the check nut and the check nut is therefore drawn very tightly against the main body with the same effect as though the check nut were threaded on the abutment with a very fine thread having a pitch equal to the difference of pitch of the two threads 51 and 52. Coöperating with the abutment 50 is a clamping screw 55 having a tapered outer end upon which an operating lever 56 is clamped by a nut 57 the arrangement being such that, by loosening nut 57, the lever 56 may be caused to operate in the desired position relative to lever 21 so that when they are thrown in opposite directions, as indicated by arrows in Fig. 2, the swaging action and clamping action upon the saw will be simultaneous, as is usual in instruments of this type.

In operation, the angle and size of the tooth to be operated on is first determined by any suitable or well known means provided with a protractor by means of which the angle of the back of the tooth may be accurately determined and this angle is correspondingly indicated by the scale 16. Bolt 14 is therefore loosened and ring 11 turned on body 10 until indicator 15 comes opposite the proper part of the scale 16, the heads 42 and 43 having also been adjusted so that, when the instrument is placed upon the saw, the plates 40 and 41 will rest upon the cutting ends of the saw tooth with one tooth in the throat between the anvil and swage. The size of the tooth to be operated on will also be determined, preferably by the tool just referred to, and the proper anvil 22 inserted and adjusted so that its working corner will just permit the movement of the highest parts of the swage past that corner, the swage 17 being turned in lever 21 to bring mark 29 opposite the proper gage mark 28. The two levers 21 and 56 are thereupon forced apart in the usual manner and the swage brought into engagement with the tooth. By this instrument, equipped as it is with the various adjustable parts, very accurate and uniform swaging results may be accomplished.

The arms 20 of lever 21, straddling the main body 10, prevent any longitudinal movement of the swage and apply the swaging force to the swage at both ends simultaneously so as to prevent any twisting of the swage. By this arrangement the swage may be readily adjusted longitudinally within the arms 20 and a fresh working face brought accurately into position.

I claim as my invention:—

1. In a swage, the combination, with the main body and the swaging members carried thereby, of a member angularly adjustable on said main body, said member carrying a pair of oppositely extending arms, a pair of supporting plates one carried by each of the said arms, means for adjusting one of said plates toward and from the main body, and means for adjusting the other of said plates in a line substantially at right angles to the line of adjustment of the other plate, and a reversible carrying head for said last mentioned plate with the ends of said plate projecting at different distances from the head.

2. In a swage, the combination, with a main body and a swage rotatably mounted therein and having its opposite ends projected beyond the main body, of an operating lever having a pair of arms straddling the main body and engaging the same at both ends of the main body to hold the lever in fixed relation to the main body axially of the swage, said operating arms each having a portion adapted to receive and clamp the adjacent projected ends of the swage, the swage being axially adjustable in said arms.

3. In a swage, the combination, with a main body and a swage rotatably mounted therein and having its opposite ends projected beyond the main body, of an operating lever having a pair of arms straddling the main body and engaging the same at both ends of the main body to hold the lever in fixed relation to the main body axially of the swage, said operating arms each having a portion adapted to receive the adjacent projected ends of the swage, the swage being axially and rotatably adjustable in said arms.

In witness whereof, I have hereunto set my hand and seal at Mellen, Wisconsin, this 4th day of April, A. D. one thousand nine hundred and eight.

JOHN F. PRIBNOW. [L. S.]

Witnesses:
W. J. STANLEY,
WM. WEAVER.

Copies of this patent may be obtained for five cents each, by addressing the "Commissioner of Patents, Washington, D. C."